US007136800B1

(12) United States Patent
Vega

(10) Patent No.: US 7,136,800 B1
(45) Date of Patent: Nov. 14, 2006

(54) ALLOCATION OF PROCESSOR RESOURCES IN AN EMULATED COMPUTING ENVIRONMENT

(75) Inventor: Rene Antonio Vega, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 588 days.

(21) Appl. No.: 10/274,509

(22) Filed: Oct. 18, 2002

(51) Int. Cl.
G06F 9/455 (2006.01)
(52) U.S. Cl. .................. 703/23; 709/226; 714/104; 714/FOR. 163
(58) Field of Classification Search ............... 703/23; 718/100, 104, FOR. 263, FOR. 163; 709/226, 709/229
See application file for complete search history.

(56) References Cited

U.S. PATENT DOCUMENTS 5,261,089 A * 11/1993 Coleman et al. .......... 707/8
6,269,391 B1 * 7/2001 Gillespie ................ 718/100
6,330,686 B1 * 12/2001 Denny et al. .............. 714/4
6,542,926 B1 * 4/2003 Zalewski et al. ......... 709/213
6,633,916 B1 * 10/2003 Kauffman ................ 709/229
6,961,941 B1 * 11/2005 Nelson et al. ............ 719/319

* cited by examiner

Primary Examiner—Albert W. Paladini
(74) Attorney, Agent, or Firm—Woodcock Washburn LLP

(57) ABSTRACT

In an emulated computing environment, a method is provided for allocating resources of the host computer system among multiple virtual machines resident on the host computer system. On the basis of the proportional weight of each virtual machine, a proportional share of resources is allocated for each virtual machine. If, for a particular virtual machine, the calculated share is less than a reserved minimum share, the virtual machine is allocated its reserved minimum share as its share of processor resources. An emulation program modulates the access of each virtual machine to the resources of the host computer system.

9 Claims, 3 Drawing Sheets

ALLOCATION OF PROCESSOR RESOURCES IN AN EMULATED COMPUTING ENVIRONMENT

TECHNICAL FIELD OF THE INVENTION

The present invention relates in general to the field of computer system emulation and, more particularly, to a method for allocating processor resources in an emulated computing environment.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

A computer manufacturer will seek to maximize its market share by having more rather than fewer applications run on the microprocessor family associated with the computer manufacturer's product line. To expand the number of operating systems and application programs that can run on a computer system, a field of technology has developed in which a given computer having one type of CPU, called a host, will include an emulation program that allows the host computer to emulate the instructions of an unrelated type of CPU, called a guest. Thus, the host computer will execute an application that will cause one or more host instructions to be called in response to a given guest instruction. Thus, the host computer can both run software designed for its own hardware architecture and software written for computers having an unrelated hardware architecture. As a more specific example, a computer system manufactured by Apple Computer, for example, may run operating systems and programs written for PC-based computer systems. It may also be possible to use an emulation program to operate concurrently on a single CPU multiple incompatible operating systems. In this arrangement, although each operating system is incompatible with the other, an emulation program can host one of the two operating systems, allowing the otherwise incompatible operating systems to run concurrently on the same computer system.

When a guest computer system is emulated on a host computer system, the guest computer system is said to be a virtual machine, as the guest computer system exists only as a software representation of the operation of the hardware architecture of the emulated guest computer system. The terms emulator and virtual machine are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulation program executing on the operating system software and hardware architecture of the host computer, such as a computer system having a PowerPC processor, mimics the operation of the entire guest computer system. The emulation program acts as the interchange between the hardware architecture of the host machine and the instructions transmitted by the software running within the emulated environment. The emulation program is sometimes referred to as a virtual machine monitor.

Multiple virtual machines can be established on a single host machine. In this scenario, a host machine of a certain processor family may host several virtual machines of the same processor family. In this computing environment, each virtual machine operates as its own stand-alone computer system, allowing a user to install separate operating systems or multiple instances of a single operating system on one or more of the virtual machines. Because each virtual machine is independent of all other virtual machines and the host machine, software running within one virtual machine has no effect on the operation of any other virtual machines or the underlying host machine. An emulated computing environment can therefore support a number of operating systems, including an array of related operating systems or multiple, concurrent instances of the same operating system, on a single host computer system.

In this emulated computing environment, a user may run multiple virtualized computer systems on a single physical computer system, eliminating the need for multiple hardware systems to support multiple computer systems. As an alternative to purchasing and configuring an additional physical computer system, an additional virtual machine may be established on an existing computer system. Running multiple, independent virtual machines on a single physical host machine provides, among other benefits, the ability to test software applications across multiple computing environments and support legacy software applications or operating systems. Running multiple virtual machines on a single host machine also results in a cost savings in that the number of physical machines and their corresponding maintenance costs are reduced. Running multiple virtual machines on a single host machines also provides the benefit of operating system and application software isolation. Because each virtual machine is operationally isolated from the host operating system and every other virtual machine, an operational failure or hang in the operating system or application software of one virtual machine will not effect the operational status of another virtual machine. Because of the operational isolation of each virtual machine, the activities of an enterprise may be consolidated in each of the virtual machines. For example, a database application may be located in one of the virtual machines, and an e-mail server may be located in another.

When multiple virtual machines are operating on a single host machine, the resources of the host machine are divided among the virtual machines on an as-needed or demand basis. As an example, if four virtual machines were running on a single host machine, the four virtual machines would share the resources of the host processor. A difficulty of operating multiple virtual machines is managing the access of each virtual machine to the resources of the host processor. If each virtual machine is provided equal access to the host processor, i.e. each virtual machine has the same execution priority, virtual machines having more important functions will have to share access on a time division basis with virtual machines having less important functions. Applying a priority to a virtual machine is also problematic. If a higher priority virtual machine becomes compute bound, the operation of all lower priority virtual machines is effectively halted.

SUMMARY OF THE INVENTION

The present invention concerns a system and method for allocating the resources of a host computer system, including the processor resources of the host computer system, among one or more virtual machines resident on the host computer system. The allocation of resources may be accomplished according to a proportional weight assigned to each virtual machine. A calculation of the share of resources is made for each virtual machine on the basis of the relative proportional weights of all virtual machines of the computer system. The allocation of processor resources may also be accomplished by reserving to certain critical virtual machines a minimum fraction of processor resources.

As another alternative for assigning host computer system resources among the virtual machines of a computer system, each virtual machine is assigned a proportional weight. The share of resources is then calculated for each virtual machine on the basis of the relative proportional weights of all virtual machines of the computer system. For those virtual machines having a reserved minimum fraction of resources, the calculated share of resources is compared to the reserved minimum fraction of resources. If the reserved minimum fraction of resources is greater than the calculated share of resources, the virtual machine is assigned as its share of resources its reserved minimum fraction of resources. The remaining processor resources are then shared on a proportional basis by those virtual machines not having been assigned its reserved minimum share of processor resources. A scheduler in an emulation program manages the allocation of processor resources and manages the execution threads of the virtual machines to meet the resource utilization goals and requirements of each virtual machine.

The resource allocation method disclosed herein is advantageous in that it provides a methodology for managing the access of multiple virtual machines to the resources of the host computer system. Because resources of the host computer system are managed for the sake of the individual needs of each virtual machine and for the sake of the needs of all the virtual machines of the computer system, a system is provided in which multiple virtual machines instances may operate on a single host computer system. Another advantage of the resource allocation method disclosed herein is the method provides for the allocation of resources to those virtual machines that must have a minimum level of processor resources. Because a minimum level of processor resources may be specified for certain virtual machines of the computer system, these virtual machines are assured of some access to processor resources even if the other virtual machines of the computer system become compute bound. Another advantage of the resource allocation method invention is a technique for modulating among the competing execution threads of the virtual machines. The modulation technique described herein provides a method for enforcing a maximum allocation of resources as well as a technique for enforcing utilization goals and allocation requirements among the virtual machines.

Other technical advantages of the present invention will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
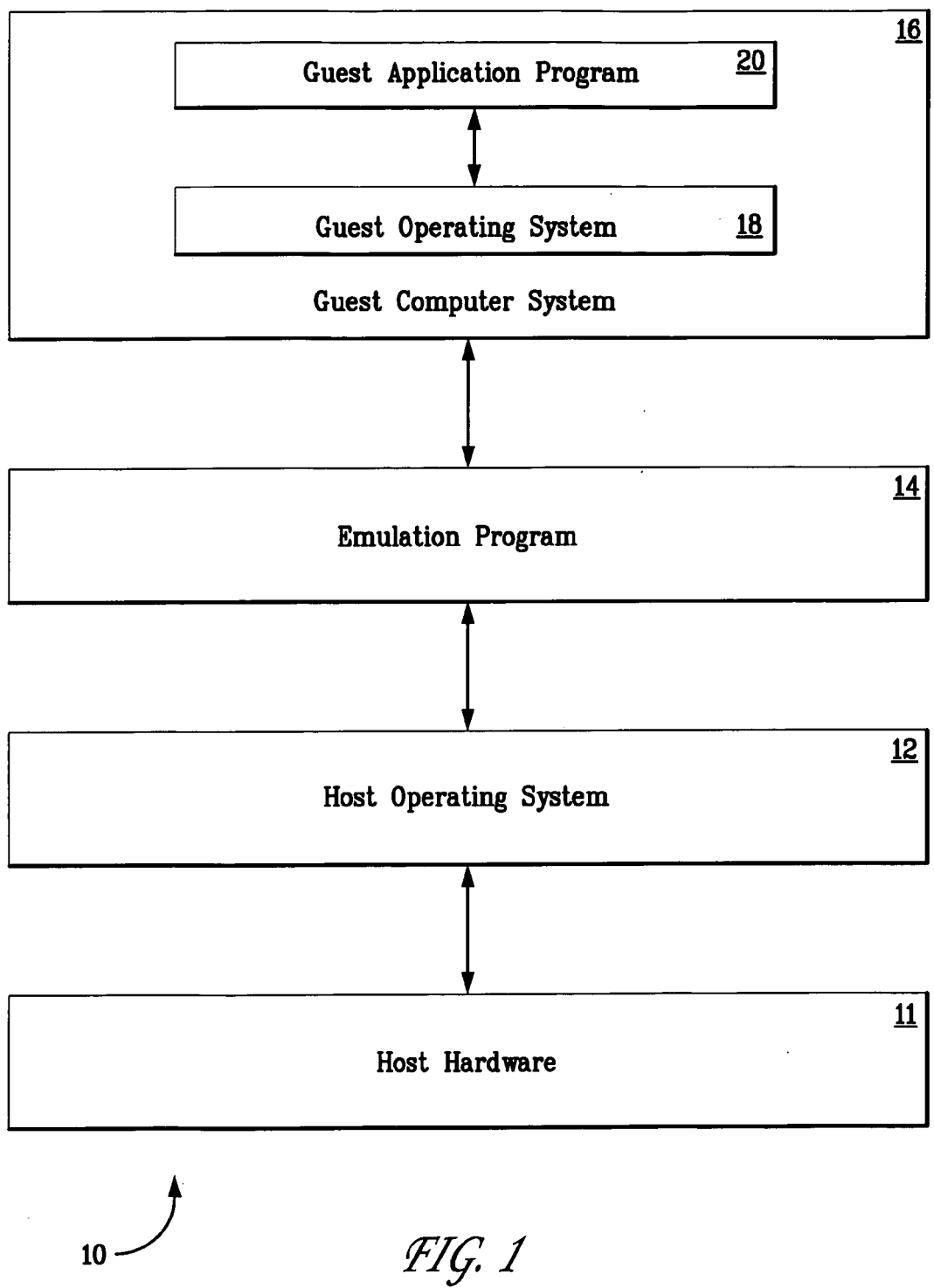
FIG. 1 is a diagram of the logical layers of the hardware and software architecture for an emulated operating environment in a computer system.

The present invention provides a system and method for the allocation of processor resources among the virtual machines of the computer system. Shown in FIG. 1 is an example of the logical layers of the hardware and software architecture for an emulated operating environment in a computer system, which is indicated generally at 10. An emulation program 14 runs on a host operating system that executes on the host computer system hardware or processor 11. Emulation program 14 emulates a guest computer system 16, which includes a guest operating system 18. Guest application programs are able to execute on guest operating system 18. In the emulated operating environment of FIG. 1, because of the operation of emulation program 14, guest application 20 can run on the computer system 10 even though guest application 20 may be designed to run on an operating system that is generally incompatible with host operating system 12 and host computer system hardware 11. As an alternative, guest operating system 20 may be the same as or a variation of host operating system 12. In the architecture of FIG. 1, guest computer system 16 operates as a virtual machine that runs independently of the host operating system 12 and the host computer system hardware 11.

Figure 2:
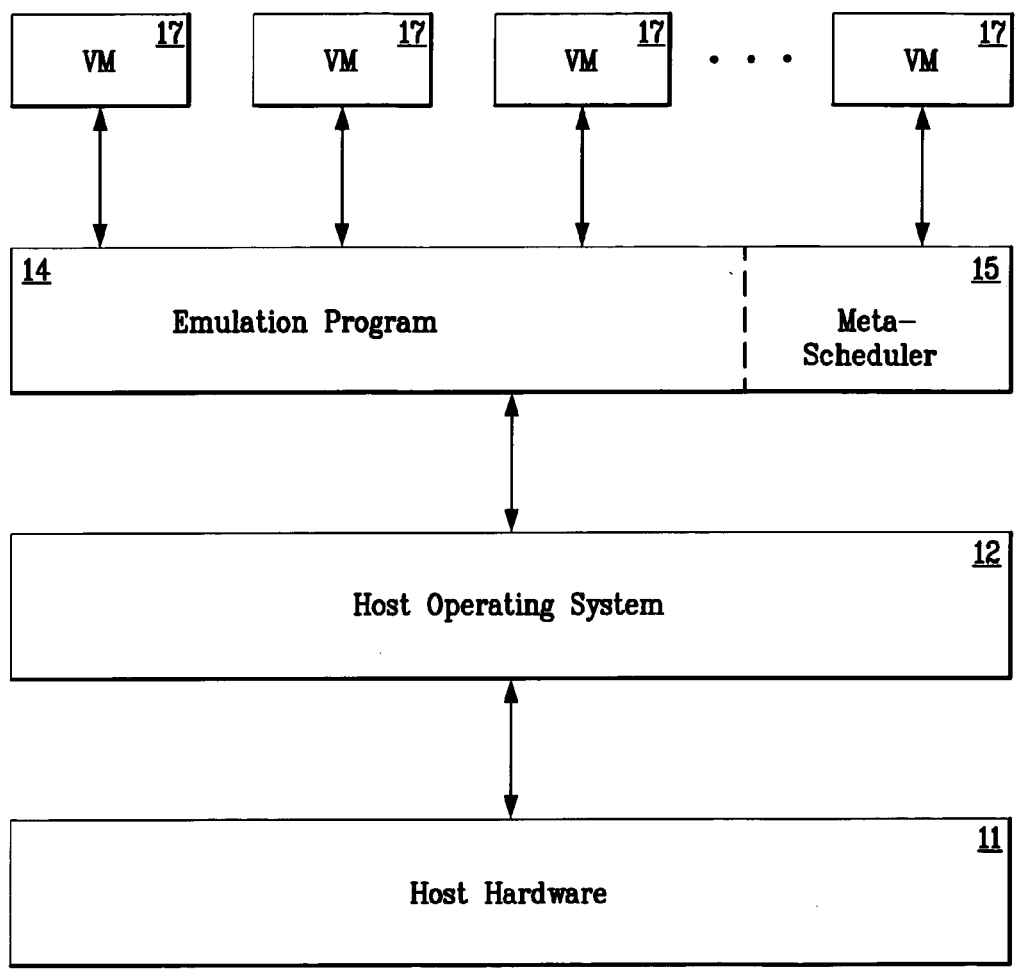
FIG. 2 is a diagram of the logical layers of the hardware and software architecture of a computer system that includes multiple virtual machines.

Shown in FIG. 2 is an example of the logical layers of the hardware and software architecture of a computer system 10 that includes multiple virtual machines 17. Each virtual machine 17 includes a guest operating system 18, and each virtual machine 17 is supported by an emulation program 14. The same operating system may be installed in each virtual machine 17. As an example, host operating system 12 may be Microsoft Windows XP™, and the operating system of each of the virtual machines may be Microsoft Windows NT™. Alternatively, variations of a single operating system may be installed across each of the virtual machines 17. As an example of this environment, host operating system 12 may be Microsoft Windows XP™, while one or more of the virtual machines runs one of the following operating systems: Windows 3.x™, Windows 95™, Windows 98™, Windows Me™, Windows NT™, Windows 2000™, MS-DOS™, Linux, BSD, OS/2™, or Novell Netware™, among other possible operating systems. Each virtual machine 17 is operationally independent of the host operating system and the other virtual machines. An operational failure in one of the virtual machines will not affect the operation of the host operating system or the other virtual machines.

Emulation program 14 will present to the processor a thread of executable code from each of the virtual machines. A component of emulation program 14 is virtual machine meta-scheduler 15. Meta-scheduler 15 allocates processor resources among the virtual machines 17 of the computer system according to a proportional capacity policy, an absolute capacity policy, or a blending of the two policies. A proportional capacity scheduling policy involves the use of a single dimensionless number that defines the weight of each virtual machine. Meta-scheduler 15 adjusts the resource allocation of each virtual machine on the basis of the weight of every other virtual machine that is contending for processor resources. The allocation of resources to a virtual machine is determined by dividing the virtual machine's proportional weight by the sum of the proportional weights of all virtual machines contending for processor resources. As an example of proportional scheduling, if four compute bound virtual machines, each with a proportional weight of 100, are contending for processor resources, each virtual machine would be apportioned 25% (100/400) of the available processor resources. As a second example, if the first of four compute bound virtual machines has a proportional weight of 200 and the other three virtual machines have a proportional weight of 100, the first virtual machine will be granted 40% (200/500) of processor resources and the other virtual machines will each be granted 20% (100/500) of processor resources.

The proportional capacity scheduling policy adjusts easily to the introduction of new virtual machines. The computations required of the proportional scheduling policy are dynamic, occurring whenever a virtual machine starts, shuts down, pauses, or resumes. Computations are also performed to accommodate adjustments in the proportional weight of a virtual machine. The use of a proportional capacity scheduling policy may, however, result in one or more virtual machines falling below a minimum resource level. The proportional capacity scheduling policy allocates processor capacity according to a formula that operates without reference to the individual resource requirements of each virtual machine. As a result, depending on the presence and activity of other virtual machines, a virtual machine may be allocated a share of processor resources that is below its required minimum resource level.

Access to processor resources can also be shared among the virtual machines according to an absolute capacity policy, in which a minimum fractional capacity is assigned to each virtual machine. As an example, in a computer system with three virtual machines, the first machine may be assigned capacity fraction of 50% and the other two virtual machines may each be assigned a capacity fraction of 25%. If each of the virtual machines were to become compute bound, each virtual machine would receive its assigned fractional percentage. The reserve, or minimum capacity, of each virtual machine applies when the virtual machines of the computer system become compute bound. In the above example, if one of the three virtual machines were to become idle while the other two virtual machines were compute bound, the two compute bound machines would share any processor resources above their assigned minimum capacity fraction in proportion to their assigned capacity fractions.

An absolute capacity policy of allocating processor resources is advantageous because each virtual machine is guaranteed a minimum level of access to processor resources when the virtual machine is contending for processor resources, even in those instances in which all virtual machines have become compute bound. An absolute capacity policy of scheduling processor resources, however, does not accommodate the dynamic addition or removal of virtual machines in the computer system. Because the capacity fraction of each virtual machine must be entered manually, the capacity fraction of one or all of the existing virtual machines must be manipulated each time that a virtual machine is added or removed from the computer system. In an absolute capacity policy, the sum of the capacity fractions assigned to the virtual machines of the computer system may be equal to or less than 100%.

Often only one or a few of the virtual machines of the computer system require a guarantee of a minimum level of access to processor resources, while the other virtual machines of the computer system are not as critical and therefore do not require a guarantee of a minimum level of processor resources. A guaranteed proportional capacity scheduling policy involves assigning a proportional weight to all virtual machines of the computer system and assigning a guaranteed minimum capacity fraction to only the most critical of the virtual machines of the computer systems. A guaranteed proportional capacity scheduling policy is a hybrid of a proportional capacity scheduling policy, in which each virtual machine must be assigned a proportional weight, and an absolute capacity scheduling policy, in which each virtual machine is assigned a capacity fraction.

As an example of the operation of a guaranteed proportional capacity scheduling policy, in a computer system having four virtual machines, each is assigned a proportional weight: Virtual Machine A (100), Virtual Machine B (100), Virtual Machine C (100), and Virtual Machine D (100). At the same time, the most critical virtual machines or virtual machines, which in this example is Virtual Machine A, is assigned a guaranteed fractional capacity of process resources. In this example, Virtual Machine A is assigned a guaranteed fractional capacity of 40%. Meta-scheduler 15 first uses the proportional weight assigned to each virtual machine to calculate a share of processor resources assigned to each virtual machine, as if a proportional capacity scheduling policy were being employed. In this instance, each of the virtual machines of the computer system is assigned to a 25% weighting (100/400) of processor resources. Because the percentage of processor resources assigned to Virtual Machine A in this example is less than the guaranteed fractional capacity of 40% of Virtual Machine A, the percentage of processor resources assigned to Virtual Machine A is set to 40%, the guaranteed fractional capacity of Virtual Machine A. The remaining 60% of processor resources are divided among the non-critical virtual machines according to their respective proportional weights. As such, each of Virtual Machine A, Virtual Machine B, and Virtual Machine C is assigned one-third (100/300) of the remaining 60% of processor resources, resulting in each of the non-critical virtual machines being assigned 20% of processor resources. Thus, if each of the virtual machines were to become compute bound, Virtual Machine A would be granted 40% of processor resources and each of the remaining virtual machines would be granted 20% of processor resources.

Figure 3:
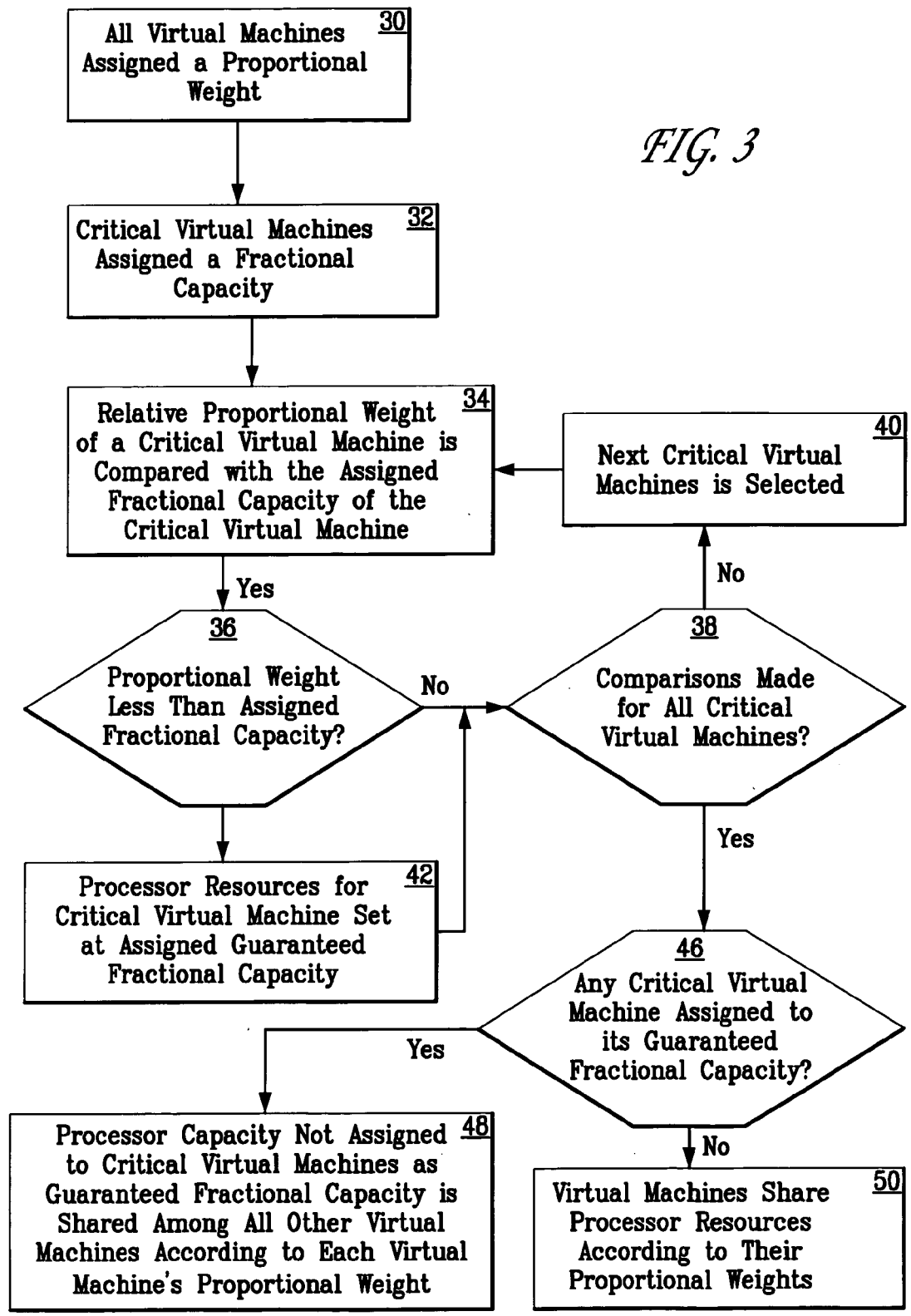
FIG. 3 is a flow diagram of the method of assigning access processor resources according to a guaranteed proportional capacity scheduling policy.

A flow diagram of the method of assigning access processor resources according to a guaranteed proportional capacity scheduling policy is shown in FIG. 3. At step 30, all virtual machines are assigned a proportional weight. At step 32, only those critical virtual machine that must operate with a minimum of processor resources are assigned a guaranteed fractional capacity. At step 34, the relative proportional weight of each critical virtual machine is compared with the each critical virtual machine's assigned fractional capacity. For the selected critical virtual machine, it is determined at step 36 whether the relative proportional weight of the virtual machine is less than its assigned fractional capacity. If the proportional weight of a virtual machine is not less than its assigned fractional capacity, it is determined at step 38 whether the comparison of proportional weight versus assigned fractional capacity has been made for all virtual machines associated with an assigned fractional capacity. If such a comparison has not been made for all virtual machines, the next critical virtual machine (i.e., a virtual machine having an assigned fractional capacity) is selected (step 40) and a comparison is made of that critical virtual machines proportional weight versus its assigned fractional capacity (step 34 and step 36).

If it is determined at step 36 that the proportional weight of a critical virtual machine is less than its assigned fractional capacity, then the critical virtual machine is set to its assigned minimum fractional capacity and processing continues at step 38 with a determination of whether a comparison of proportional weight versus assigned fractional capacity has been made for all critical virtual machines. Once it is determined at step 38 that a comparison of proportional weight versus assigned minimum fractional capacity has been made for all virtual machines, it is determined at step 46 whether at least one critical virtual machine has been allocated processor resources according to its guaranteed fractional capacity. If so, then at step 48, the remaining processor capacity is shared among all virtual machines not assigned to a guaranteed fractional capacity on the basis of the respective proportional weights. If none of the virtual machines of the computer system has been assigned its guaranteed fractional capacity, the virtual machines of the computer system share processor resources according to their proportional weights.

Once the allocation of processor resources has been determined by one of the techniques described herein, meta-scheduler 15 modulates each virtual machine's access to processor resources according to the prescribed utilization goals and minimum access requirements described above. The utilization goal of a virtual machine is a guideline of the share of processor resources that should be allocated to that virtual machine. In comparison, a virtual machine's reserve or minimum is the share of processor resources that must be provided to that virtual machine. In particular, if multiple virtual machines are contending for processor resources, meta-scheduler 15 may pause each virtual machine for short periods to meet utilization goals or to enforce rules concerning minimum access to processor resources. Pausing a virtual machine may be effective in enforcing a cap or maximum on a single virtual machine's share of processor resources.

The meta-scheduler also performs the task of switching the access to processor resources among the virtual machines. Meta-scheduler must select an access ratio to modulate the access of each virtual machine to process resources. The access ratio must be selected to minimize the overhead caused by switching among the execution threads of the virtual machines. As an example, a utilization goal of 5% could have an access ratio of 5/100 or 1/20. The numerator of the access ratio is chosen to be as small as possible, although the numerator must be above a lower limit that is some factor of the host operating system context switching time. The numerator represents the minimum interval during which a virtual machine is provided access to processor resources. As an example, the context switching time for the virtual machines of a computer system may be between 10 and 20 microseconds. This time includes the context switching time of the host processor and the overhead associated with at least two transitions between the guest computer system and the host computer system. To achieve a switching overhead of 1% or less, and assuming a total context switching overhead of 20 microseconds, the minimum interval for access to processor resources is 2000 microseconds, yielding an access ratio of 2000/40,000. The minimum interval should not be greater than a defined upper limit at which latency is not observed in the operation of the virtual machines. This defined upper limit may be, for example, 20 milliseconds.

The present invention is not limited in its application to the emulation of a particular computer system architecture, particularly the Intel 80X86 architecture. Rather, the emulation technique disclosed herein is applicable any time it is desirable to control the processor allocations of multiple instances of software in a virtual or emulated computing environment. It should be also understood that the invention described herein is not limited to the allocation of processor resources of a computer system. Other resources of the computer system could be allocated among the virtual machines of a computer system. The techniques of the present invention could be employed in those instances in which the host operating system and the guest operating systems are variants within the same family of operating systems. Alternatively, the host operating systems and one or more of the guest operating systems could be operating systems associated with different hardware platforms.

Although the present invention has been described in detail, it should be understood that various changes, substitutions, and alterations can be made thereto without departing from the spirit and scope of the invention as defined by the appended claims.

What is claimed is:

1. A method for sharing the processor resources of a host computer system among multiple virtual machines emulated on the host computer system, comprising the steps of:

determining, according to an allocation policy, the share of processor resources to be allocated to each virtual machine;

allocating to each virtual machine its share of processor resources; and modulating in the emulation program the access of each virtual machine to the processor resources of the host computer system.

2. The method for sharing the resources of a host computer system among multiple virtual machines emulated on the host computer system of claim 1, wherein the step of determining the share of processor resources to be allocated to each virtual machine comprises the step of allocating processor resources according to the fraction of processor resources assigned to each virtual machine.

3. The method for sharing the resources of a host computer system among multiple virtual machines emulated on the host computer system of claim 1, wherein the step of modulating in the emulation program the access of each virtual machine to the processor resources of the host computer system comprises the step of pausing a virtual machine for an interval such that the virtual machine is provided its determined share of processor resources.

4. The method for sharing the resources of a host computer system among multiple virtual machines emulated on the host computer system of claim 1, wherein the step of modulating in the emulation program the access of each virtual machine to the processor resources of the host computer system comprises the step of switching the access of the multiple virtual machines to processor resources according to an access ratio.

5. The method for sharing the resources of a host computer system among multiple virtual machines emulated on the host computer system of claim 4, wherein the access ratio is chosen such that the minimum interval during which a virtual machine has access to processor resources is (a) some time that is sufficiently longer than the time required to switch access between virtual machines and (b) less than the time at which latency is observed in the operation of the virtual machines.

6. The method for sharing the resources of a host computer system among multiple virtual machines emulated on the host computer system of claim 5, wherein the minimum interval is at least 100 times longer than the time required to switch access between virtual machines.

7. A method for sharing the resources of a host computer system among multiple virtual machines emulated on the host computer system, comprising the steps of:

calculating a share of resources for each virtual machine;

for at least one of the virtual machines, comparing the calculated share of resources to a reserve share associated with the virtual machine;

if, for any virtual machine, the reserve share of resources is greater than the calculated share of resources, assigning the reserve share of resources to the virtual machine;

apportioning the share of resources not assigned to virtual machines requiring access to a minimum share of resources among all other virtual machines; and modulating the access of each virtual machine to the resources of the host computer system to provide each virtual machine the share of resources assigned or calculated for each virtual machine.

8. The method for sharing the resources of a host computer system among multiple virtual machines emulated on the host computer system of claim 7, wherein the step of comparing the calculated share to a reserve share comprises the step of comparing the calculated share to a reserve share of resources for those virtual machines requiring access to a minimum share of resources.

9. The method for sharing the resources of a host computer system among multiple virtual machines emulated on the host computer system of claim 7, wherein the resources of the host computer system to be shared are processor resources.

* * * * *